T. E. MURRAY, Jr.
METHOD OF ELECTRIC WELDING.
APPLICATION FILED FEB. 12, 1919.
1,302,413.
Patented Apr. 29, 1919.
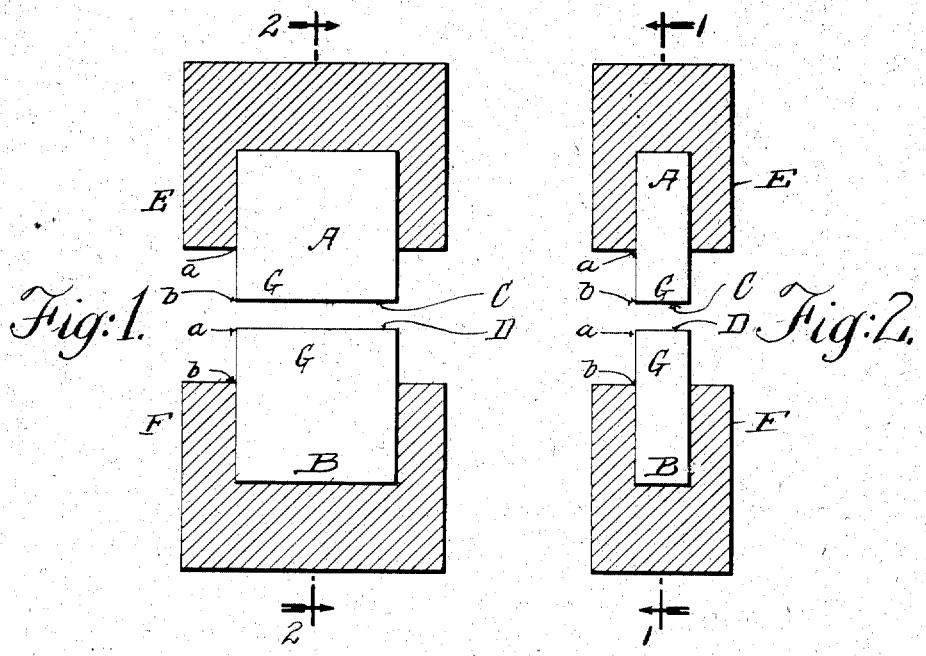
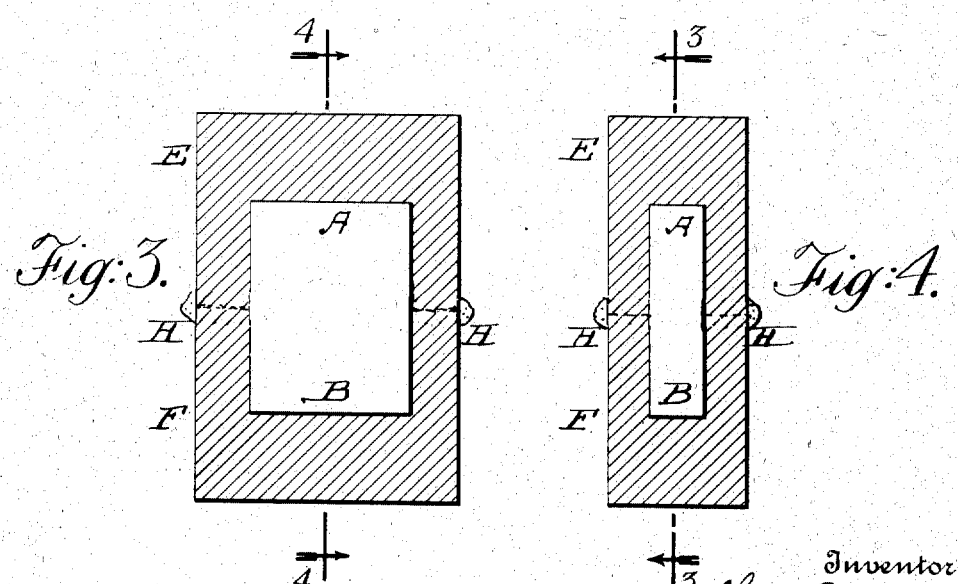

UNITED STATES PATENT OFFICE.

THOMAS E. MURRAY, JR., OF BROOKLYN, NEW YORK.

METHOD OF ELECTRIC WELDING.

1,302,413.   Specification of Letters Patent.   Patented Apr. 29, 1919.

Application filed February 12, 1919. Serial No. 276,523.

*To all whom it may concern:*

Be it known that I, THOMAS E. MURRAY, Jr., a citizen of the United States, residing at Brooklyn, in the county of Kings and State of New York, have invented a certain new and useful Improvement in Methods of Electric Welding, of which the following is a specification.

The invention is a method of electric welding, whereby I am enabled to produce a perfect welded joint between two objects, and consists in the steps more particularly hereinafter set forth.

In the accompanying drawings—

Figure 1 is a vertical section on the line 1, 1 of Fig. 2, through two plates to be welded seated in their respective electrodes. Fig. 2 is a vertical section on the line 2, 2 of Fig. 1. Fig. 3 is a vertical section on the line 3, 3 of Fig. 4, through said plates after welding. Fig. 4 is a vertical section on the line 4, 4 of Fig. 3.

Similar letters of reference indicate like parts.

A and B are the objects to be welded at their registering edges C, D. Said objects are here shown seated respectively in recesses in the electrodes E, F. The electrode F may be a fixed electrode, and the electrode E may be movable toward and from said fixed electrode. When the objects A, B are seated in the electrodes E, F, a portion G of each object protrudes into the space between said electrodes. These portions G are known as "take-ups", and will be so referred to hereinafter. The amount of protrusion of each take-up—hereinafter for convenience called the "depth"—is represented by the distance $a$, $b$ in Figs. 1 and 2. During the welding, the take-ups are either wholly or for some predetermined portion of their depths fused, and as this fusion takes place the objects are pressed together, or, as before stated, the movable electrode E carrying object A is moved toward the fixed electrode F carrying object B. As a consequence, the fused metal of the take-ups is extruded from the welded joint, as indicated at H in Figs. 3 and 4. If the take-ups are fused over their whole depths, then the opposing faces of the electrodes E, F may come together, and the total length of the welded objects will be obviously equal to the sum of the lengths of so much of the unwelded objects as was seated in the recesses in electrodes E, F. If, on the other hand, the take-ups are fused over only a part of their depths, then the total length of the welded objects will obviously be equal to the sum of the lengths of so much of the unwelded objects as was seated in the recesses in electrodes E, F, plus the sum of the unfused portions of the two take-ups. In the actual welding operation, object A is moved into contact registry with object B, the welding current is established to fuse the take-ups, and object A is pressed against object B, with the result, as already stated, that the metal of the melted take-ups or of the melted fractions of said take-ups, as the case may be, becomes extruded at the joint, as indicated at H.

Simple as this welding operation may appear from the foregoing description, as a matter of practical application it is not so, because of the variable factors which really govern it. These are: (1) strength of welding current; (2) depth of take-ups; (3) speed of pressing movement. My present method is based on the discovery of the relations between these factors, through which I am enabled to produce, even under wide variations of said factors individually, perfect welded joints.

For purposes of illustration, I will again take the simple conditions shown in the drawings already described—premising, for further simplicity, that the take-ups are to be wholly fused. I will assume that the objects A, B are steel plates, and that I shall select a welding current of 5,000 amperes to the square inch of joint. Knowing the horizontal cross sectional area of the plates, I determine such depths for the take-ups as will insure their cubic volume being such as that they will become fused by the current noted, without burning the metal, in a time period which I will here call $x$. That is to say, if before any welding current is established I should bring the edges C, D into contact and keep both plates stationary, then the 5,000 ampere current will fuse the take-ups in time period $x$. This determined, all that remains to be done is to provide means for mechanically moving the plate A toward the plate B with a speed which will cause the pressing movement to be completed and the fused metal extruded in a time period not greater than period $x$. Or in simpler terms, in the time which it will take the selected current to fuse the take-ups, I complete the movement which presses the plates to their desired united length and extrudes the fused metal. Or, still more condensed, I simply adjust the three factors above noted relatively to one another, but always so that no matter whether I am using a current of 100 amperes or of 30,000 amperes, or even over, the cubic dimensions of the take-ups and the pressing speed will result in the weld being made within the time period which the current requires to fuse the take-ups.

The foregoing is all that is necessary to successfully operate my process with any strength of current and with any electrically weldable objects.

I claim:

The method of electric welding, which consists in forming take-ups of predetermined dimensions on the objects to be welded, placing said take-ups in registering contact, establishing a welding current to fuse said take-ups, and pressing said objects together until said take-ups are extruded at the joint, the said pressing movement being timed to correspond to the period of current flow required to produce said fusion of said take-ups.

In testimony whereof I have affixed my signature in presence of two witnesses.

THOMAS E. MURRAY, Jr.

Witnesses:
GERTRUDE T. PORTER,
MAY T. McGARRY,

Copies of this patent may be obtained for five cents each, by addressing the "Commissioner of Patents, Washington, D. C."